Nov. 16, 1948.   C. P. SHOOK, JR   2,454,224
BELT CONNECTOR

Filed Jan. 27, 1945   2 Sheets-Sheet 1

CHARLES P. SHOOK JR.
*INVENTOR.*

BY
ATTORNEY

Nov. 16, 1948.　　　　C. P. SHOOK, JR　　　　2,454,224
BELT CONNECTOR

Filed Jan. 27, 1945　　　　　　　　　　　　2 Sheets-Sheet 2

CHARLES P. SHOOK JR
*INVENTOR.*

BY
*Henry L. Jennings*
ATTORNEY

Patented Nov. 16, 1948

2,454,224

UNITED STATES PATENT OFFICE 2,454,224

BELT CONNECTOR

Charles P. Shook, Jr., Birmingham, Ala.

Application January 27, 1945, Serial No. 574,959

2 Claims. (Cl. 24—33)

This invention relates to belt connectors, more particularly to connectors for the well known, transversely flexible type conveying belt, in which the connector comprises a series of hinges joined together by a continuous flexible pintle or hinge pin, and has for an object the provision of a device of the character designated which shall be simple and economical of design and which may be easily and accurately applied to a belt in a minimum of time and with a minimum of skilled labor.

A further object of my invention is to provide a belt connector comprising a series of hinges in side by side relation, in which the connector forms its own templet for laying off the belt to which it is to be applied, thereby providing accurate alignment of the holes in the belt from side to side, an even spacing of the hinge members, and an even pull on all the members after assembly.

A still further object of my invention is to provide a belt connector comprising a series of hinges in side by side relation, in which the hinges are mounted on a temporary, snugly fitting, pintle or hinge pin with spacing rings between the separate hinge members, whereby the assembly may be applied to the ends of the belt to be connected and the belt marked off, the assembled connector removed from the belt and the bolt holes punched, after which the assembly is again placed on the belt with a permanent flexible pintle or hinge pin.

Another object of my invention is to provide a belt connector comprising a series of hinges in side by side relation, in which the connector forms its own templet for laying off the belt to which it is to be applied, and in which means are provided for holding the belt in proper position with respect to the series of hinges while it is being laid off.

As is well known in the art to which my invention relates, difficulties have heretofore been encountered in laying off wide, transversely flexible conveying belts, for connection by a series of hinges as herein contemplated. Very careful workmanship was required in laying off the belts due to the fact that the holes in the belt, as it is laid off, must be evenly spaced and in alignment so that the hinge members will be evenly spaced and there will be an even and equal strain on the various hinge members when the connector is in service. Templets have usually been employed for laying off the bolt holes in the belt and this has necessitated a separate template for each size and make of belt connector. Often such templates are misplaced or lost, resulting in loss of time and inaccurate laying off.

These and other difficulties are overcome in accordance with my invention in which I provide a connector comprising a plurality of hinge members which are hinged together by a temporary, snugly fitting pintle or hinge member, made of wood, paper, or other suitable material, and in which the hinge members are evenly spaced apart by means of spacer rings mounted on the pintle. The hinge members include belt stops or gauges which accurately position the ends of the belt in the hinge members when being laid off, and further, I provide means for holding the belt in its proper relation to the hinge members while being laid off.

These and other features of my invention are illustrated in the accompanying drawing, forming a part of this application, in which Fig. 1 is a plan view showing my improved connector and the manner of applying a belt;

Figure 1:
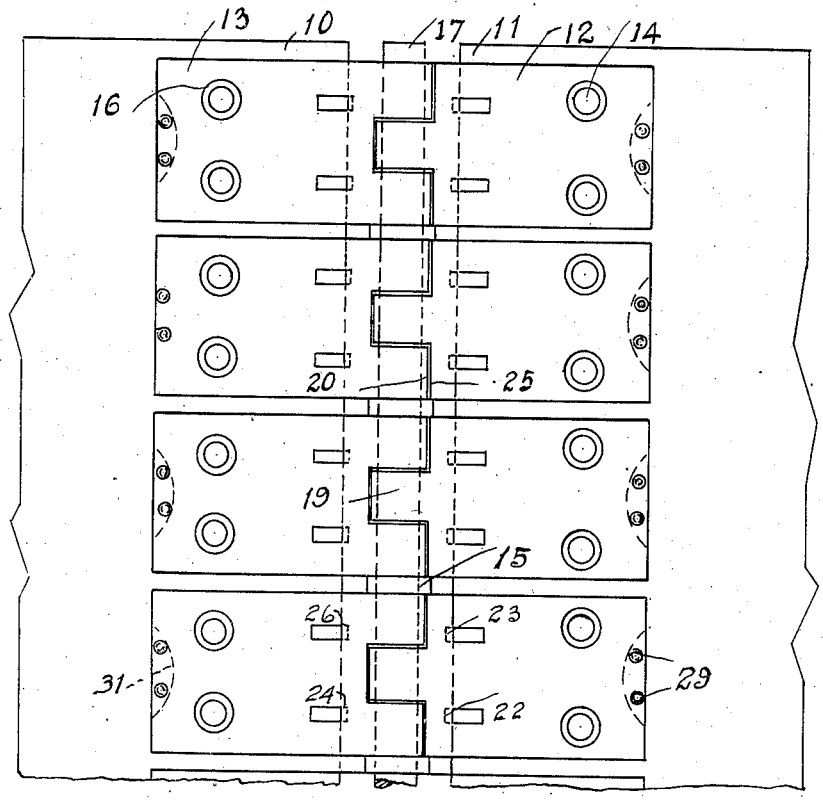

Referring now to the drawings for a better understanding of my invention, I show in Fig. 1 fragments of a belt having ends 10 and 11 which are connected together by means of my improved connector. The connector comprises a multiplicity of hinges each embodying a male hinge member 12 and a female hinge member 13. The member 12 is provided with a pair of bolt holes 14 and the member 13 is provided with a pair of bolt holes 16 which are more closely spaced than the bolt holes 14 whereby, in assembling the connector on a belt, to prevent placing a hinge member on the wrong side. It is contemplated that a sufficient number of hinge members 12 and 13 will be provided in each assembly to equal the width of flexible belts usually found in commercial practice, which may vary from a width of 12 to 36 inches.

Figure 2:
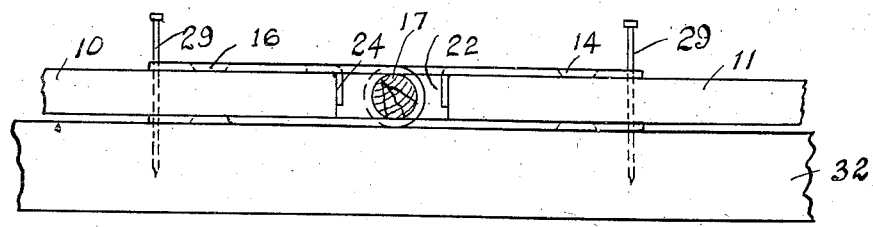
Fig. 2 is a side view of Fig. 1.

The hinge members 12 and 13, as shown in Figs. 1 and 2, are joined together by a temporary, snugly fitting pintle 17 which may be made of wood or other suitable material, and are spaced apart to the proper spacing by means of spacer rings 15. A temporary, snugly fitting pintle is preferred to the permanent pintle for the reason that the latter must be loose enough to prevent chafing and thus would bring about inaccuracies in laying off if employed as part of a templet, as hereinafter described.

Figure 3:
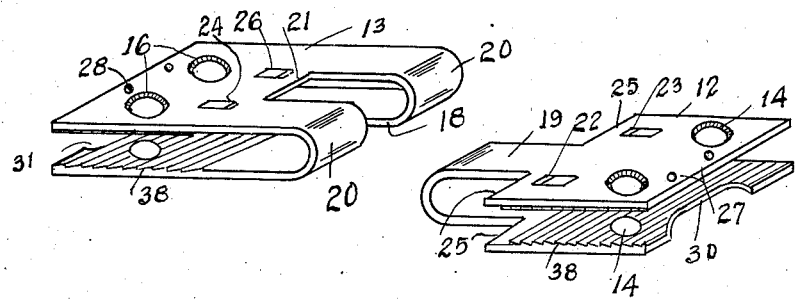
Fig. 3 is a perspective view showing the hinge members of my improved connector.

As may be seen in Fig. 3, the hinge members 12 and 13 are made of metal plate bent to a U shape, the female member 13 having a central opening 18 and the male member 12 having a central projection 19 which fits into the opening 18 and bottoms against the inner wall 21 of said opening. Also, the shoulders 20 on the female member abut the shoulders 25 on the male member, thereby fixing the relationship of the member 12 to the member 13. Aligned belt stops 22 and 23 are struck downwardly from the upper side of the male member 12 and similar stops 24 and 26 are struck downwardly from the upper side of the female member 13. I also provide holes 27 and 28 in the members 12 and 13 respectively near the outer edge of the upper sides thereof for the reception of nails 29 to hold the belt in place with respect to the hinge members when the belt is being laid off. Beneath the holes 27 I notch out the lower side of the hinge member 12 as shown at 30 and similarly notch out the member 13 as shown at 31 so that the nails may pass down through the belt into a floor or work bench 32 as shown in Fig. 2.

Figure 4:
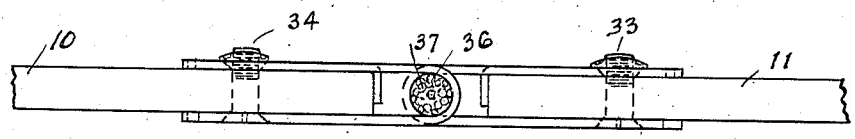
Fig. 4 is a side view of the connector after it is applied to a belt.

In applying my improved connector to a belt, an assembly of hinge members mounted on a temporary pintle 17, and of a width suitable for the belt to which it is to be applied, is selected. The ends 10 and 11 on the belt are then squared up and inserted between the sides of the hinge members 12 and 13 with the edges of the ends of the belt abutting the stop members 22 and 23 in the male member and 24 and 26 in the female member 13. When the belt is properly positioned with respect to the hinge members, it is secured to a wooden board, floor, or work bench 32, by means of the nails 29 which hold the ends of the belt in proper position with respect to the hinge members. In this position, it will be seen that the hinge members are held in properly spaced relation by means of the spacer rings 15 and are held in proper position with respect to the belt and by means of the temporary pintle 17. With the hinge members and the belt thus secured, the locations of the holes 14 and 16 are marked clear across the belt, the nails 29 are removed, and the assembly of hinge members is removed from the belt ends. The holes in the belt are then punched, all the way across, and the ends of the belt again inserted between the sides of the hinge members. Bolts 33 and 34 are then applied, as shown in Fig. 4, and a permanent pintle which may comprise a piece of wire cable 36, preferably having a rubber covering, is applied in the place of the temporary pintle 17 and the ends are welded over as shown at 37. The spacer rings 15 may be replaced on the permanent pintle if required to prevent the sifting of fine material between the hinge members. Preferably, the inner surfaces of the sides of the hinge members 12 and 13 are serrated as shown at 38 to provide a better grip on the belt.

From the foregoing, it will be seen that my improved connector assembly provides a ready and accurate means for mounting it on a wide, flexible, conveyor type belt, with a minimum of skilled labor, and when applied, there is an even and accurate alignment of the bolt holes and an even strain on the hinge members in service.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. A belt connector adapted for application to relatively wide, transversely flexible belts, comprising a relatively long temporary pintle, a plurality of hinges mounted on the pintle in side to side relation, each comprised of a pair of interconnecting U-shaped members fitting snugly about the pintle and having bolt holes therein for the reception of securing means for the belt, spacers on the pintle to limit movement of the hinge members toward each other said members abutting in end to end relation to limit movement thereof transversely of the pintle, and belt stops in each of the members closely adjacent the pintle, all of the said stops being in alignment across the connector, each of said U-shaped members having a plurality of small holes therein for reception of temporary securing means for a belt when marking it for punching.

2. A belt connector assembly for application to relatively wide flexible conveyer belts comprising a rigid temporary pintle, a multiplicity of hinges disposed side by side in closely spaced relation on the pintle, each of said hinges comprising a pair of interconnecting U-shaped hinge members with bolt holes therethrough, each fitting snugly about the pintle and each having shoulders thereon abutting cooperating shoulders on its interconnected member, spacing members on the pintle between the hinges, and a plurality of inwardly turned belt stops on each of the hinge members adjacent the pintle, all of said stops on opposite sides of the pintle being in alignment parallel with the pintle.

CHARLES P. SHOOK, JR.

REFERENCES CITED

The following references are of record in the file of this patent:

UNITED STATES PATENTS

| Number | Name | Date |
|---|---|---|
| 90,876 | Rudiger | June 1, 1869 |
| 399,962 | Avery | Mar. 19, 1889 |
| 1,444,301 | Bukovecz | Feb. 6, 1923 |
| 2,099,831 | Taber | Nov. 23, 1937 |

FOREIGN PATENTS

| Number | Country | Date |
|---|---|---|
| 21,183 | Great Britain | 1908 |